Nov. 15, 1938.     F. S. FLOETER     2,136,680
BROACHING MACHINE
Filed Dec. 17, 1936
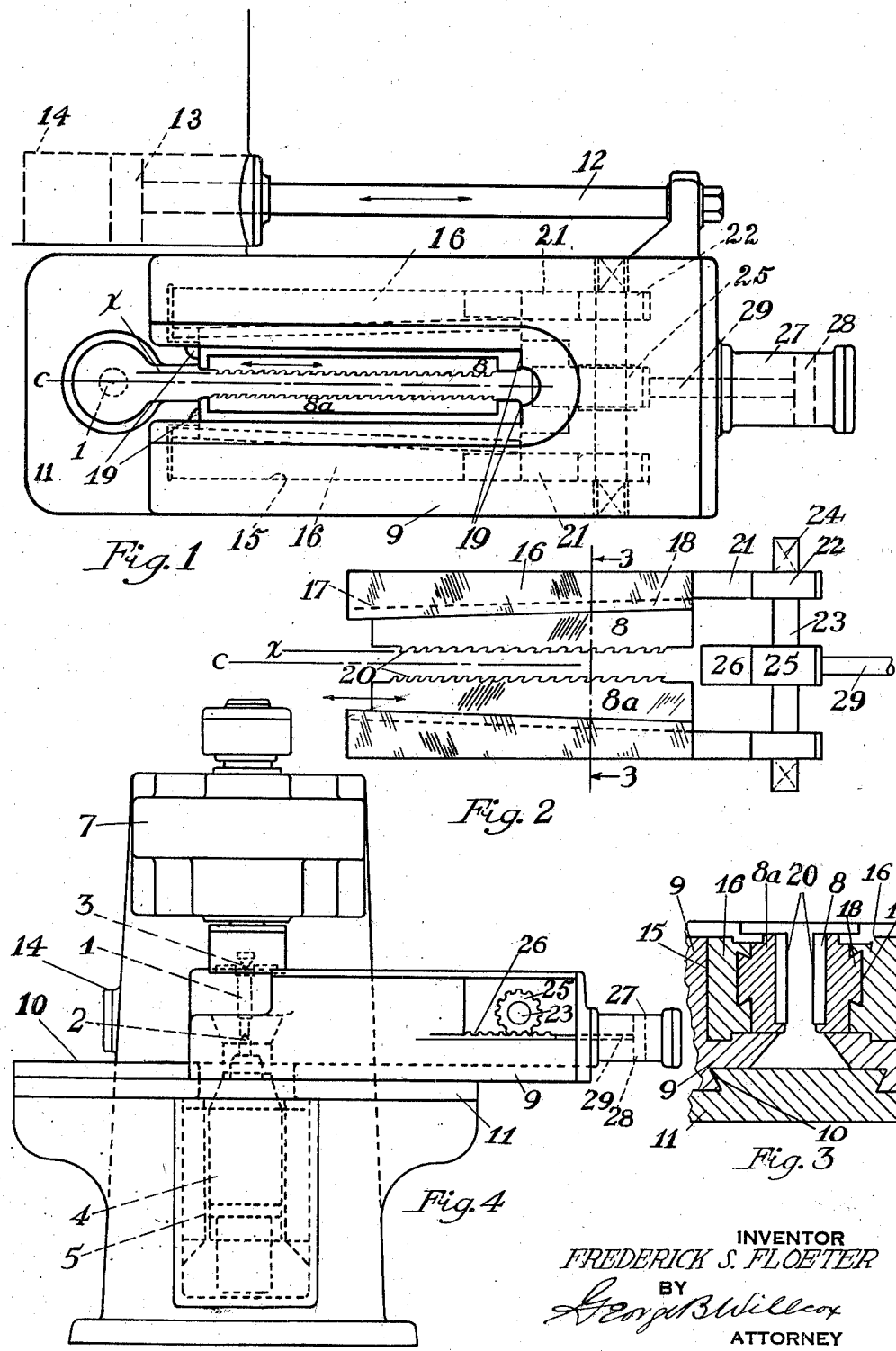
INVENTOR
FREDERICK S. FLOETER
BY
George B. Willcox
ATTORNEY Patented Nov. 15, 1938

2,136,680

UNITED STATES PATENT OFFICE 2,136,680

BROACHING MACHINE

Frederick S. Floeter, Saginaw, Mich., assignor to Wickes Bros., Saginaw, Mich., a corporation of Michigan Application December 17, 1936, Serial No. 116,303

7 Claims. (Cl. 90—33)

This invention is concerned with the problem of turning and facing work pieces by broaching.

In machines for doing work of this character the work piece may be kept immovable during the cutting operation if it is to be faced off flat, or else may be rotated about its longitudinal axis and thus be made cylindric. Each tooth of the broach cuts into the work piece in its regular order, removing a chip or shaving of predetermined thickness. The aggregate depth of cut is determined by the number of teeth that engage the work during one working traverse of the broach; usually a sufficient number to bring the work to the desired size and finish.

Broaches for this class of work generally have their cutting teeth disposed in one of two ways: either "stepped" or "non-stepped".

In the stepped tooth arrangement the successive teeth were offset relatively to each other so that each tooth removed a shaving of equal thickness. The stepped-tooth type of broach had disadvantages, one being its lack of adjustability when it was desired to remove more or less metal per pass. Another was its inability to compensate for tooth wear.

In the non-stepped arrangement the broach teeth all moved in a single plane instead of in the great number of mutually offset parallel planes characteristic of the stepped tooth type. U. S. Patent No. 2,039,480 was issued to me May 5, 1936, for a broaching machine wherein the broach bar was provided with non-stepped teeth. The lateral or feeding-in movement of the teeth was accomplished by moving the work piece bodily sidewise toward the broach, during the longitudinal travel of the broach. That patented machine can be readily adjusted to suit different materials and different sizes of work pieces, and its accuracy can be maintained in spite of tooth wear and repeated resharpenings. However, in some situations it is not feasible to shift the work piece sidewise during the stroke of the broach.

My present invention relates more particularly to a novel combination of devices for reciprocating the broach and for coincidently feeding the broach toward the work. The improvement is applicable to broaches of either the stepped type or the non-stepped, although it is primarily adapted to the latter.

A general object of the present improvement is to provide a broaching machine of such character, employing a minimum number of working parts and moving joints, all of which are simple in design, durable, relatively inexpensive to construct, and capable of long continued use without harmful wear.

Other objects of my present improvement are:

To provide new, useful and simplified mechanism for supporting the work in fixed position while moving the broach teeth laterally toward the work piece, coincidently with the lengthwise movements or cutting strokes of the broach; to provide means for regulating and controlling the rate of such lateral movement; to provide such a tooth-feed regulating device with means whereby the teeth may be fed into the work at a steady rate or at varying rates during the outward longitudinal stroke of the broach or during the reverse stroke, or during both strokes, or after completion of a working stroke, whichever the operator may find best suited to the work in hand; to provide a lateral broach feed device of such character which shall be capable of controlling a single broach that operates upon one face of a work piece, or of controlling two broaches that operate simultaneously on opposite sides of the work.

The last mentioned dual broach type installation, which has been chosen for purposes of description herein, has another desirable feature. It will turn and accurately finish round work pieces that are slender and of small diameter, as for example, the valve stems of internal combustion engines. Dual broaches support such a spindle-like work piece equally on opposite sides and thus prevent axial springing of the work. Since two cuts are taken simultaneously the production rate is practically doubled.

With the foregoing and certain other objects in view, which will appear later in the specifications, my invention comprises the devices described and claimed and the equivalents thereof.

In the accompanying drawing:

Fig. 1 is a diagrammatic plan view of the traveling work table of a broaching machine embodying my invention as it appears when dual or co-operating opposed broaches are employed.

Fig. 2 is a diagrammatic plan view of the lateral feed-in device for the broaches shown in Fig. 1, omitting the travelling platen on which the feed device is carried.

Fig. 3 is a sectional view, taken on line 3—3 of Fig. 2, enlarged and partly broken away, showing the arrangement of the opposed broaches and of the guideways in which they are mounted on the platen.

Fig. 4 is a front view of the machine, showing diagrammatically the location of the rack and gear mechanism on the traveling platen adapted to impart lateral movement to the broach teeth during the endwise reciprocation of the platen and broaches.

Numeral 1, Figs. 1 and 4, designates a rotatable work piece to be machined while turning, although it might be a non-rotatable piece to be merely faced off. The work piece is here shown as a pin or spindle supported at one end by a lathe center 2 and rotated by means of a centering chuck 3. The center 2 is retractible endwise to facilitate inserting and removing the work piece and is actuated by a plunger 4 of a hydraulic cylinder 5. Chuck 3 and work piece 1 are rotated by means of a motor-driven gearing in housing 7 through a suitable gear reduction unit.

Machining is done by a co-operating pair of opposed broaches 8, 8a, that have lengthwise reciprocatory movement past the work piece, in the direction of the arrows, Figs. 1 and 2. The broach teeth are arranged with their cutting edges alined to define a plane $x$, substantially tangent to the rotating periphery of the work piece and parallel with a median plane C, which includes the axis of rotation of work piece 1.

Here it may be explained that although two opposed broaches 8, 8a are illustrated, only one of them, 8, will be referred to at first in order to describe conveniently the general mode of operation and scope of my claimed invention. Certain additional advantages are inherent in the two-broach arrangement 8, 8a, and will be pointed out later.

In the embodiment shown in the drawing, the broaches are mounted on and travel with a platen 9 that slides lengthwise along ways 10, Fig. 3, on the machine bed 11. The platen 9 is actuated by the piston rod 12 and piston 13 of an hydraulic cylinder 14, which is mounted in fixed position on the machine bed, as shown in Figs. 1 and 4.

A mechanism for feeding the teeth into the work is mounted to travel with or on the platen 9, and moves the broach laterally and coincidentally with its reciprocation, in a manner now to be described.

Platen 9 is provided with a channel 15, Fig. 3, in which a feed bar 16 is capable of limited lengthwise sliding movement.

The slidable bar 16 has its inner face sloped slightly in the direction of its length, presenting a tapered and dovetailed seat 17, Figs. 2 and 3. A correspondingly tapered and dovetailed guide member 18, on the back or outer wall of broach 8, engages the seat 17, enabling broaches 8 to be removed from bars 16.

The tapered seat 17 of feed bar 16, when adjusted lengthwise along the channel 15 of the platen 9, gives the broach 8 a limited amount of transverse or inward movement relatively to the platen. Abutments or keepers 19 on the platen 9, Fig. 1, at the ends of the broach, permit this sidewise movement of the broach 8 while preventing its endwise movement on platen 9.

Broadly, the functioning of the broach 8 and broach-feed bar 16 in the manner above described may be considered as that of a cam. Although flat wedge or tapered parts 16, 18 are shown it is obvious that such form is merely one of a number of cam-like arrangements that may be employed without going beyond the scope of my invention as set forth in certain of the claims.

Power means is carried directly upon the platen 9, or else is otherwise arranged to travel with it, for sliding the bar 16 lengthwise and moving the broach 8 crosswise. Such power means is arranged to operate regardless of whether the platen 9 be at an end of its stroke or in the midst of a stroke.

A toothed rack 21 is fixed to bar 16, Fig. 2, and projects beyond its end. A pinion 22 meshes with rack 21, being fixed to a shaft 23 which is rotatable in bearings 24 on platen 9. Shaft 23 is driven by means of a pinion 25. A rack 26, slidable lengthwise on the traveling platen 9, as shown in Fig. 4, meshes with the pinion 25.

An hydraulic cylinder 27 is mounted upon and carried by platen 9 and has a piston 28 and a piston rod 29 which latter is fixed to the sliding rack 26. Cylinder 27 furnishes the power for moving the rack 26 back and forth along the platen.

When oil or other fluid under pressure is applied to cylinder 27 by any suitable means such as a power driven pump (not shown) the lengthwise movement of rack 26 produces rotation of shaft 23, and pinion 22 and the rack 21 shift the broach-feed bar 16 lengthwise a distance determined by the travel of the piston 28. The broach 8 moves sidewise accordingly.

By regulating the speed of travel of piston 28, the broach 8 can be fed sidewise toward the work piece 1 at any desired rate. Known fluid control valves may be employed for that purpose.

When the broach has the fit or non-stepped type of tooth arrangement as herein shown, an appropriate feed-in motion coincidental with its lengthwise movement is necessary. But if a stepped-tooth broach is employed it is unnecessary to use any power feed device for moving the broach transversely during its cutting stroke, because the stepped arrangement gives the necessary tooth offset for the respective cuts.

The power feed-in means shown can be employed advantageously with the non-stepped type for shifting the position of the broach teeth laterally with respect to the work piece when the broach is at the end of a cutting stroke.

Although I have shown and described a hydraulic cylinder as being a preferred power means for driving the platen back and forth, and have described a hydraulic cylinder carried upon the platen as the preferred power means for reciprocating the slidable bar 16 lengthwise, it is to be understood that the term "power means" employed in certain of the appended claims is to be interpreted to include power means other than hydraulic; for example, suitable geared electric motors with control switches may be employed for either or both of the services without departing from the claimed invention.

Having thus described my invention, what I claim and desire to secure by Letters Patent is:

1. In a broaching machine including means for supporting a work piece and having a platen mounted for lengthwise reciprocatory movement past the work piece, power means for reciprocating said platen, a toothed broach mounted on said platen and having the cutting edges of its teeth alined in a plane substantially parallel to the plane of said reciprocatory movement of the platen, power actuated mechanism operatively connected to the broach and mounted to travel with said platen, being arranged and adapted to move the broach coincidently with the reciprocatory movement of the platen transversely to a plane defined by the cutting edges of the teeth, toward and away from the work piece.

2. In a broaching machine, in combination, means for supporting and axially rotating a work piece, a broach having teeth with their cutting edges alined in a plane substantially tangent to the periphery of such rotating work piece; power means to impart reciprocating travel to the broach parallel to said plane of the teeth, and means, mounted to travel with the broach during its reciprocations and operative during said reciprocation to impart thereto translatory feeding-in movements transverse to said plane, toward the center line of the work piece.

3. In a broaching machine including means for supporting a work piece and having a platen mounted for lengthwise reciprocatory movement past the work piece, said platen carrying a toothed broach; power means for reciprocating the platen and broach; a motor mounted on said platen, and means operatively connecting the motor to the broach and arranged and adapted to move the broach, coincidently with the reciprocatory movement of the platen, in direction transverse to the plane defined by the cutting edges of the teeth, toward and away from the work piece.

4. In a broaching machine including means for supporting a work piece and a platen mounted for lengthwise reciprocatory movement past the work piece, a pair of parallel toothed broaches on said platen, spaced apart on opposite sides of the center line thereof, power means for reciprocating the platen and broaches; a motor mounted on said platen and travelling therewith; and means operatively connecting the motor to the respective broaches and arranged and adapted to move the same coincidently with the movements of the platen, in directions transverse to a plane defined by the cutting edges of the broach teeth, whereby the broaches are actuated simultaneously and equally toward and away from the work piece.

5. In a broaching machine including means for supporting a rotary work piece, a bifurcated platen having a member located at each side of the work piece, said platen being mounted for reciprocatory movement past the work piece, a pair of parallel toothed broaches, one on each of said members and spaced apart on opposite sides of the center line of the work piece, means for reciprocating the platen and broaches, a motor, and means operatively connecting the motor to the respective broaches and arranged and adapted to move the broaches coincidently with the movements of the platen and transversely to the planes defined by the cutting edges of the teeth of the respective broaches whereby the broaches are actuated simultaneously and equally toward the work piece.

6. In a broaching machine including means for rotatably supporting a work piece and having a platen mounted for lengthwise reciprocatory movement past the work piece, a toothed broach mounted on said platen and arranged for lateral movement relatively thereto, means for actuating both the platen and broach together in the direction of the length of the broach; a motor, and means including a tapered longitudinally slidable feed bar operatively connecting the motor to the broach and adapted to move the broach relatively to the platen in a lateral direction transverse to a plane defined by the cutting edges of the broach teeth, the operation of the motor being coincidental with the reciprocatory movement of the platen.

7. In a broaching machine including means for rotatably supporting a work piece and having a platen mounted for lengthwise reciprocatory movement past the work piece, a toothed broach mounted on said platen and arranged for lateral feeding-in movement relatively thereto, means for reciprocating both the platen and broach together in the direction of the length of the broach; a motor, and cam means operatively connecting the motor to the broach and adapted to move the broach relatively to the platen in a feeding-in direction transverse to the plane defined by the cutting edges of the broach teeth and coincidental with the reciprocatory movement of the platen.

FREDERICK S. FLOETER.